S. C. MYERS & J. McCAULEY.
COMBINED BAND CUTTER AND FEEDER FOR THRESHING MACHINES.
No. 111,469. Patented Jan. 31, 1871.
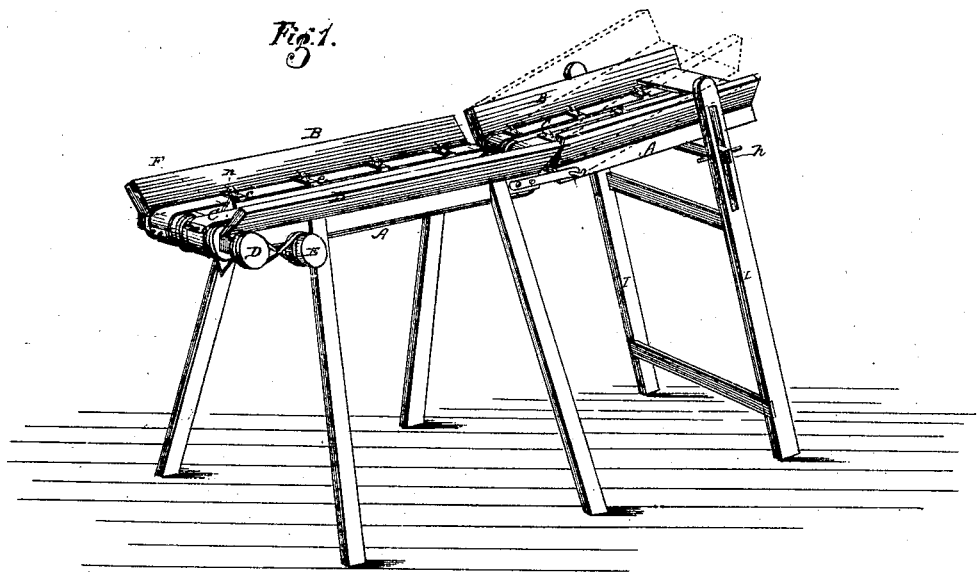
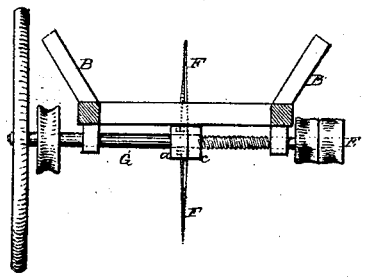
Witnesses:
Inventors:
S. C. Myers, &
J. McCauley,
by Dodge & Munn
Attys.

United States Patent Office.

SAMUEL C. MYERS AND JAMES McCAULEY, OF McALLISTERVILLE, PENNSYLVANIA.

Letters Patent No. 111,469, dated January 31, 1871.

IMPROVEMENT IN COMBINED BAND-CUTTERS AND FEEDERS FOR THRASHING-MACHINES

*The Schedule referred to in these Letters Patent and making part of the same.*

*To all whom it may concern:*

Be it known that we, SAMUEL C. MYERS and JAMES McCAULEY, of McAllisterville, in the county of Juniata and State of Pennsylvania, have invented certain Improvements in Combined Conveyers and Band-Cutters, of which the following is a specification, reference being had to the accompanying drawing.

Our invention relates to devices for conveying sheafs of grain from the stack, mow, or load, to a thrashing-machine, and cutting the band thereof at the same time, the invention consisting more particularly in making the conveyer in jointed sections, adjustable with special devices for insuring the carrying of the grain, and in a novel construction and manner of attaching the reversible knives, all as hereinafter more fully explained.

Figure 1 is a perspective view of the apparatus complete;

Figure 2, a transverse section; and

Figure 3, a view of the knives detached from the machine.

Various plans have heretofore been adopted to cut bands of sheafs, and efforts have been made to produce an apparatus that would do this and at the same time receive and convey the grain from the stack, mow, or load, to the thrasher, but all have been objectionable for one reason or another.

The object of our invention is to produce an apparatus for this purpose that will be more perfect in its operation, and that will be adapted to a wider range of use.

To accomplish these objects we construct a frame, A, consisting of a bottom with inclined or flaring side-boards, B, mounted on legs of a suitable height, as represented in fig. 1.

At each end of this frame or chute we arrange, transversely, a shaft or roller, around which we pass two endless belts C C, these belts being arranged side by side with a space between them.

Near the lower end of the frame A, on its under side, we locate another shaft, G, having a pulley, E, on one end, and if desired a balance-wheel on it also.

On this shaft, at its center, we secure two knives F, the form of which is shown in fig. 3, there being a slot or opening through the bottom of the frame A, through which the knives protrude as the shaft rotates, as shown in figs. 1 and 2.

The knives F are made of the form shown in fig. 3, and are double-edged, with sickle-teeth on each edge. To secure them to the shaft G we provide a nut, *a*, which has in one side two grooves or recesses, into which the ends of the knives are fitted, these ends being bent at a right angle to fit therein, as shown clearly in fig. 2.

We then provide another nut, *c*, which is screwed up tight against the opposite side of the knives, thus locking them firmly in position. Instead of the grooves and bent ends, pins and holes may be used to secure the knives in place, the pins being on the knives to fit into holes in the nut *a*, or the holes may be made in the knives and the pins project from the face of the nut, these being obvious modifications of the same plan. By this method of constructing and securing the knives it will be seen that they may be reversed, either one or both, at any time when one edge has become dull or injured, and that either or both may be removed for sharpening, or to be replaced in case of accident, with the greatest facility.

To the apparatus thus made we then attach one or more additional sections of chutes A', as represented in fig. 1. This additional section is provided with carrier-belts C, the same as the preceding, and it is hinged to the front section in such a manner that its rear end can be elevated more or less, as may be desired, and as indicated by the dotted lines in fig. 1.

This section A' is supported at its rear end upon a pair of slotted legs, I, by means of which it may be adjusted and held at any required inclination.

The belts C have secured upon their outer surface, at intervals, small blocks or cleats *e*, from the surface of which project small pins *n*, for the purpose of taking hold on the straw or grain and insuring its being fed along. The only object of using two belts instead of one is to afford a space for the knives to rotate between them, and also because when a bundle is placed on them it is less likely to roll off against the side-boards B than would be the case if a single wide belt was used, as in the former case the bundle is apt to lie partially in the space between the two, and thus kept from contact with the sides. In the additional sections, however, a single belt may be used, as in that no space is required for the knives, and if it sufficiently inclines to insure the sliding of the sheaf down to the front section, the belt in the rear section may be dispensed with.

It is obvious that any number of sections may be added, or that the rear section may be made of any desired length; but we prefer to use additional sections, for the reason that the apparatus can be more readily adapted to the various locations and conditions in which the apparatus is to be used.

The apparatus is to be driven by being connected in any suitable manner with the thrashing-machine or motive power, preferably the former.

An apparatus thus constructed may be used with any thrasher and in any position. It may be arranged at right angles to the feeding-table of the machine, either on the right or the left-hand side, or it may be placed parallel with the sides of the machine, or at an angle thereto, either forward or in rear of the feeding-table, all that is required being that it shall be so located that its rear end shall be in proper position to conveniently receive the bundles from the mow, stack, or load, as the case may be, and its front end so located as to deliver them to the feeding-table or throat of the machine.

A cross-bar should be placed across the rear end, near the rear roller, around which the belts C pass to hold the bundles up when thrown upon the extreme end of the chute, and to prevent the straw from becoming entangled or wound around the shaft at its bearings.

The operation is as follows:

The apparatus being suitably located, the bundles of grain are simply thrown in at the upper end, when they are carried forward, and as they are brought one at a time over the knives, the latter revolving rapidly cut the band, when the bundle falls apart more or less and is conveyed to the lower end, where it drops upon the table or into the throat of the machine according as it may be set. As the stack or mow is lowered the rear end of the chute is lowered or adjusted accordingly.

By these means we provide an apparatus that performs the operations of conveyer and band-cutter in a very superior manner, and that is adapted to be used in a great variety of positions and locations.

Having described our invention,

What we claim is—

1. A combined conveyer and band-cutter, consisting of sectional chutes, one or all of which shall be provided with carrier-belts C, and having the revolving knives F arranged therein, substantially as described.

2. In a band-cutter, the detachable and reversible knives F, having sickle-teeth formed on their edges, substantially as described.

3. The nut $a$ provided with grooves, in combination with the knives having their ends bent to fit therein, and the nut C arranged upon the shaft G, substantially as described.

4. In a band-cutter the slotted legs I, in combination with the hinged section A for adjusting the latter, as described.

5. The combination of the carrier-belts $c$, cleats $e$, pins $n$, and revolving knives F, when said parts are relatively arranged as shown, and for the purpose described and set forth.

SAMUEL O. MYERS.
JAMES McCAULEY.

Witnesses:
T. M. THOMPSON,
J. T. CRISIVELL.